(12) United States Patent
Robbin et al.

(10) Patent No.: US 7,345,671 B2
(45) Date of Patent: Mar. 18, 2008

(54) METHOD AND APPARATUS FOR USE OF ROTATIONAL USER INPUTS

(75) Inventors: Jeffrey L. Robbin, Los Altos, CA (US); Steve Jobs, Palo Alto, CA (US); Philip W. Schiller, Half Moon Bay, CA (US)

(73) Assignee: Apple Inc., Cupertino, CA (US)

(*) Notice: Subject to any disclaimer, the term of this patent is extended or adjusted under 35 U.S.C. 154(b) by 348 days.

(21) Appl. No.: 10/259,159

(22) Filed: Sep. 26, 2002

(65) Prior Publication Data

US 2003/0095096 A1 May 22, 2003

Related U.S. Application Data

(60) Provisional application No. 60/387,692, filed on Jun. 10, 2002, provisional application No. 60/359,551, filed on Feb. 25, 2002, provisional application No. 60/346,237, filed on Oct. 22, 2001.

(51) Int. Cl.
*G09G 5/00* (2006.01)
(52) U.S. Cl. ............... 345/156; 345/172; 345/173; 345/180; 178/18.01; 178/18.03
(58) Field of Classification Search ............... 345/184, 345/156–157, 172–173, 684, 179, 180; 178/18.01, 178/18.03
See application file for complete search history.

(56) References Cited

U.S. PATENT DOCUMENTS 1,061,578 A 5/1913 Wischhusen et al.
2,798,907 A 7/1957 Schneider
2,903,229 A 9/1959 Landge
2,945,111 A 7/1960 McCormick
3,005,055 A 10/1961 Mattke
3,965,399 A 6/1976 Walker et al.
4,103,252 A 7/1978 Bobick
4,110,749 A 8/1978 Janko et al.
4,121,204 A 10/1978 Welch et al.

(Continued)

FOREIGN PATENT DOCUMENTS

DE 3615742 11/1987

(Continued)

OTHER PUBLICATIONS

"About Quicktip®" www.logicad3d.com/docs/qt.html, downloaded Apr. 8, 2002.

(Continued)

*Primary Examiner*—Richard Hjerpe
*Assistant Examiner*—Leonid Shapiro

(57) ABSTRACT

Improved approaches for users of computing devices to interact with graphical user interfaces are described. According to one aspect, a rotational user action supplied by a user at a user input device is transformed into linear action with respect to a graphical user interface. According to another aspect, a portion of an extended list of items is displayed by a graphical user interface and, through rotational user actions at a user input device, the portion of the list being displayed can be varied with welcomed ease of use. Although the type of computing device can vary, the improved approaches are particularly well-suited for use with a portable media player.

45 Claims, 9 Drawing Sheets

U.S. PATENT DOCUMENTS

| | | |
|---|---|---|
| 4,129,747 A | 12/1978 | Pepper |
| 4,158,216 A | 6/1979 | Bigelow |
| 4,246,452 A | 1/1981 | Chandler |
| 4,264,903 A | 4/1981 | Bigelow |
| 4,293,734 A | 10/1981 | Pepper, Jr. |
| 4,380,007 A | 4/1983 | Steinegger |
| 4,380,040 A | 4/1983 | Posset |
| 4,475,008 A | 10/1984 | Doi et al. |
| 4,570,149 A | 2/1986 | Thornburg et al. |
| 4,587,378 A | 5/1986 | Moore |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,798,919 A | 1/1989 | Miessler et al. |
| 4,810,992 A | 3/1989 | Eventoff |
| 4,831,359 A | 5/1989 | Newell |
| 4,849,852 A | 7/1989 | Mullins |
| 4,856,993 A | 8/1989 | Maness et al. |
| 4,866,602 A | 9/1989 | Hall |
| 4,897,511 A | 1/1990 | Itaya et al. |
| 4,914,624 A | 4/1990 | Dunthorn |
| 4,917,516 A | 4/1990 | Retter |
| 4,951,036 A | 8/1990 | Grueter et al. |
| 4,990,900 A | 2/1991 | Kikuchi |
| 5,008,497 A | 4/1991 | Asher |
| 5,036,321 A | 7/1991 | Leach et al. |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,231,326 A | 7/1993 | Echols |
| 5,237,311 A | 8/1993 | Mailey et al. |
| 5,305,017 A | 4/1994 | Gerpheide |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,495,566 A | 2/1996 | Kwatinetz |
| 5,508,703 A | 4/1996 | Okamura et al. |
| 5,543,588 A | 8/1996 | Bisset et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,893 A | 12/1996 | Gaughan et al. |
| 5,596,347 A | 1/1997 | Robertson et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| D382,550 S | 8/1997 | Kaneko et al. |
| 5,657,012 A | 8/1997 | Tait |
| D385,542 S | 10/1997 | Kaneko et al. |
| 5,689,285 A | 11/1997 | Asher |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,805,144 A | 9/1998 | Scholder et al. |
| 5,808,602 A | 9/1998 | Sellers |
| 5,825,353 A * | 10/1998 | Will .......................... 345/184 |
| 5,828,364 A | 10/1998 | Siddiqui |
| 5,838,304 A | 11/1998 | Hall |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,822 A | 1/1999 | Du et al. |
| 5,859,629 A | 1/1999 | Tognazzini |
| 5,875,311 A | 2/1999 | Bertram et al. |
| 5,883,619 A | 3/1999 | Ho et al. |
| 5,889,236 A | 3/1999 | Gillespie et al. |
| 5,903,229 A * | 5/1999 | Kishi .......................... 341/20 |
| 5,907,152 A | 5/1999 | Dandiliker et al. |
| 5,907,318 A | 5/1999 | Medina |
| 5,909,211 A * | 6/1999 | Combs et al. ............... 345/172 |
| 5,914,706 A | 6/1999 | Kono |
| 5,923,388 A | 7/1999 | Kurashima et al. |
| 5,943,044 A | 8/1999 | Martinelli et al. |
| 5,956,019 A | 9/1999 | Bang et al. |
| 5,959,611 A | 9/1999 | Smailagic et al. |
| 5,973,668 A | 10/1999 | Watanabe |
| 6,000,000 A | 12/1999 | Hawkins et al. |
| 6,002,389 A | 12/1999 | Kasser |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,075,533 A | 6/2000 | Chang |
| 6,084,574 A | 7/2000 | Bidiville |
| 6,097,372 A | 8/2000 | Suzuki |
| 6,124,587 A | 9/2000 | Bidiville |
| 6,128,006 A | 10/2000 | Rosenberg et al. |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| 6,188,393 B1 | 2/2001 | Shu |
| 6,191,774 B1 | 2/2001 | Schena et al. |
| 6,198,473 B1 | 3/2001 | Armstrong |
| 6,211,861 B1 | 4/2001 | Rosenberg et al. |
| 6,219,038 B1 | 4/2001 | Cho |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| D443,616 S | 6/2001 | Fisher et al. |
| 6,243,078 B1 | 6/2001 | Rosenberg |
| 6,256,011 B1 | 7/2001 | Culver |
| 6,262,717 B1 | 7/2001 | Donohue et al. |
| 6,266,050 B1 | 7/2001 | Oh et al. |
| 6,297,795 B1 | 10/2001 | Kato et al. |
| 6,323,845 B1 | 11/2001 | Robbins |

| | | | | | | |
|---|---|---|---|---|---|---|
| 6,340,800 | B1 | 1/2002 | Zhai et al. | JP | 05080938 A | 4/1993 |
| D454,568 | S | 3/2002 | Andre et al. | JP | 5-189110 | 7/1993 |
| 6,373,470 | B1 | 4/2002 | Andre et al. | JP | 5-205565 | 8/1993 |
| 6,377,530 | B1 * | 4/2002 | Burrows ............... 369/59.21 | JP | 5-211021 | 8/1993 |
| 6,429,852 | B1 | 8/2002 | Adams et al. | JP | 5-217464 | 8/1993 |
| 6,473,069 | B1 | 10/2002 | Gerphelde | JP | 05-262276 | 10/1993 |
| 6,492,979 | B1 | 12/2002 | Kent et al. | JP | 5-265656 | 10/1993 |
| 6,496,181 | B1 | 12/2002 | Bomer et al. | JP | 5-274956 | 10/1993 |
| 6,497,412 | B1 * | 12/2002 | Bramm ................. 273/430 | JP | 05-289811 | 11/1993 |
| 6,587,091 | B2 | 7/2003 | Serpa | JP | 5-298955 | 11/1993 |
| 6,636,197 | B1 | 10/2003 | Goldenberg et al. | JP | 5-325723 | 12/1993 |
| 6,639,584 | B1 * | 10/2003 | Li ............................ 345/173 | JP | 06-20570 | 1/1994 |
| 6,650,975 | B2 * | 11/2003 | Ruffner ................ 701/23 | JP | 06-208433 | 2/1994 |
| 6,677,927 | B1 | 1/2004 | Bruck et al. | JP | 6-084428 | 3/1994 |
| 6,686,904 | B1 | 2/2004 | Sherman et al. | JP | 6-089636 | 3/1994 |
| 6,703,550 | B2 | 3/2004 | Chu | JP | 06-096639 | 4/1994 |
| 6,724,817 | B1 | 4/2004 | Simpson et al. | JP | 6-96639 | 4/1994 |
| 6,727,889 | B2 | 4/2004 | Shaw | JP | 06-111685 | 4/1994 |
| 6,738,045 | B2 | 5/2004 | Hinckley et al. | JP | 6-111695 | 4/1994 |
| 6,750,803 | B2 | 6/2004 | Yates et al. | JP | 06-111695 | 4/1994 |
| 6,791,533 | B2 | 9/2004 | Su | JP | 6-139879 | 5/1994 |
| 6,795,057 | B2 | 9/2004 | Gordon | JP | 06-187078 | 7/1994 |
| 6,844,872 | B1 | 1/2005 | Farag et al. | JP | 6-267382 | 9/1994 |
| 6,978,127 | B1 | 12/2005 | Bulthuis et al. | JP | 06-283993 | 10/1994 |
| 2001/0011991 | A1 | 8/2001 | Wang et al. | JP | 6-333459 | 12/1994 |
| 2001/0043545 | A1 * | 11/2001 | Aratani ................... 369/95 | JP | 07-107574 | 4/1995 |
| 2001/0050673 | A1 | 12/2001 | Davenport | JP | 7-107574 | 4/1995 |
| 2001/0051046 | A1 * | 12/2001 | Watanabe et al. ......... 396/287 | JP | 07-107574 A | 4/1995 |
| 2002/0030665 | A1 | 3/2002 | Ano | JP | 7-41882 | 7/1995 |
| 2002/0033848 | A1 | 3/2002 | Sciammarella et al. | JP | JU 07-41882 | 7/1995 |
| 2002/0045960 | A1 | 4/2002 | Phillips et al. | JP | 7-201249 | 8/1995 |
| 2002/0089545 | A1 | 7/2002 | Levi Montalcini | JP | 07-201256 | 8/1995 |
| 2002/0118169 | A1 | 8/2002 | Hinckley et al. | JP | 07-253838 | 10/1995 |
| 2002/0154090 | A1 | 10/2002 | Lin | JP | 7-261899 | 10/1995 |
| 2002/0158844 | A1 | 10/2002 | McLoone et al. | JP | 07-261899 | 10/1995 |
| 2002/0164156 | A1 * | 11/2002 | Bilbrey ................... 386/112 | JP | 7-261922 | 10/1995 |
| 2002/0180701 | A1 | 12/2002 | Hayama et al. | JP | 07-296670 | 11/1995 |
| 2003/0043121 | A1 | 3/2003 | Chen | JP | 07-319001 | * 12/1995 |
| 2003/0050092 | A1 * | 3/2003 | Yun ........................... 455/556 | JP | 08-016292 | 1/1996 |
| 2003/0076301 | A1 | 4/2003 | Tsuk et al. | JP | 08-115158 | 5/1996 |
| 2003/0076303 | A1 | 4/2003 | Huppi | JP | 8-115158 | 5/1996 |
| 2003/0076306 | A1 | 4/2003 | Zadesky et al. | JP | 8-203387 | 8/1996 |
| 2003/0098851 | A1 | 5/2003 | Brink | JP | 8-293226 | 11/1996 |
| 2003/0184517 | A1 | 10/2003 | Senzui et al. | JP | 8-298045 | 11/1996 |
| 2004/0239622 | A1 | 12/2004 | Proctor et al. | JP | 08-299541 | 11/1996 |
| 2004/0252109 | A1 | 12/2004 | Trent, Jr. et al. | JP | 8-316664 | 11/1996 |
| | | | | JP | 09-128148 | 5/1997 |
| | | FOREIGN PATENT DOCUMENTS | | JP | 9-218747 | 8/1997 |
| | | | | JP | 9-230993 | 9/1997 |
| DE | | 19722636 A1 | 12/1998 | JP | 09-230993 | 9/1997 |
| DE | | 10022537 A1 | 11/2000 | JP | 9-231858 | 9/1997 |
| EP | | 0 498 540 A2 | 1/1992 | JP | 09-233161 | 9/1997 |
| EP | | 0674288 A1 | 9/1995 | JP | 9-251347 | 9/1997 |
| EP | | 0 731 407 A1 | 9/1996 | JP | 9-258895 | 10/1997 |
| EP | | 0 551 778 B1 | 1/1997 | JP | 9-288926 | 11/1997 |
| EP | | 0551778 B1 | 1/1997 | JP | 10-074429 | 3/1998 |
| EP | | 0 880 091 A2 | 11/1998 | JP | 10-198507 | 7/1998 |
| EP | | 1 026 713 A1 | 8/2000 | JP | 10-227878 | 8/1998 |
| EP | | 1 162 826 | 12/2001 | JP | 10-326149 | 12/1998 |
| FR | | 2 686 440 A1 | 7/1993 | JP | 11-184607 | 7/1999 |
| JP | | JU 55-174009 | 6/1982 | JP | 11-194863 | 7/1999 |
| JP | | JU 57-95722 | 6/1982 | JP | 11-194872 | 7/1999 |
| JP | | JU 05-36623 | 5/1983 | JP | 11-194883 | 7/1999 |
| JP | | 05-233141 | 9/1983 | JP | 11-203045 | 7/1999 |
| JP | | 61-117619 | 6/1986 | JP | A1998-12010 | 7/1999 |
| JP | | 61-124009 | 6/1986 | JP | A 1998-12025 | 7/1999 |
| JP | | 61-164547 | 1/1988 | JP | A 1998-12026 | 7/1999 |
| JP | | 63-106826 | 5/1988 | JP | A 1998-12027 | 7/1999 |
| JP | | 63-181022 | 7/1988 | JP | A 1998-12028 | 7/1999 |
| JP | | 63-298518 | 12/1988 | JP | A 1998-12029 | 7/1999 |
| JP | | 04-32920 | 2/1992 | JP | 11-272378 | 10/1999 |
| JP | | 5-041135 | 2/1993 | JP | A 1998-89535 | 10/1999 |
| JP | | 5-101741 | 4/1993 | JP | 2002-215549 | 8/2000 |

| | | |
|---|---|---|
| JP | 2000-267786 | 9/2000 |
| JP | 2002-353045 | 12/2000 |
| JP | 2001-11769 | 1/2001 |
| JP | 2001-22508 | 1/2001 |
| JP | JU 03-57617 | 6/2001 |
| JP | 2002-215311 | 8/2002 |
| JP | 2003280807 | 2/2003 |
| JP | A 2005-99635 | 9/2005 |
| JP | A 2005-133824 | 10/2005 |
| JP | A 2005-134953 | 10/2005 |
| JP | A 2005-235579 | 1/2006 |
| JP | A 2005-358970 | 7/2006 |
| JP | 3852854 | 9/2006 |
| JP | 3852854 | 12/2006 |
| JP | A 2005-312433 | 5/2007 |
| KR | 1998-71394 | 10/1998 |
| KR | 1999-50198 | 7/1999 |
| KR | 2000-8579 | 2/2000 |
| TW | 431607 | 4/2001 |
| WO | WO 94/17494 | 8/1994 |
| WO | WO 98/14863 | 4/1998 |
| WO | WO 99/49443 | 9/1999 |

OTHER PUBLICATIONS

"Neuros MP3 Digital Audio Computer," www.neurosaudio.com, downloaded Apr. 9, 2003.
"OEM Touchpad Modules" website www.glidepoint.com/sales/modules.index.shtml, downloaded Feb. 13, 2002.
"Product Overview—ErgoCommander®," www.logicad3d.com/products/ErgoCommander.htm, downloaded Apr. 8, 2002.
"Product Overview—SpaceMouse® Classic," www.logicad3d.com/products/Classic.htm, downloaded Apr. 8, 2002.
"Synaptics Touch Pad Interfacing Guide," Second Edition, Mar. 25, 1998, Synaptics, Inc. San Jose, CA, pp. 1 to 90.
Chapweske, Adam, "PS/2 Mouse/Keyboard Protocol," 1999, http://panda.cs.ndsu.nodak.edu/~achapwes/PICmicro/PS2/ps2.htm.
Fiore, Andrew, "Zen Touchpad," Cornell University, May 2000.
Gadgetboy, "Point and click with the latest mice," CNET Asia Product Review, www.asia.cnet.com/reviews...are/gadgetboy/0,39001770,38023590,00.htm, downloaded Dec. 5, 2001.
Tessler et al., "Touchpads Three new input devices," website www.macworld.com/1996/02/review/1806.html, downloaded Feb. 13, 2002.
"Der Klangmeister," Connect Magazine, Aug. 1998.
Photographs of Innovations 2000 Best of Show Award presented at the 2000 International CES Innovations 2000 Design & Engineering Showcase, 1 pg.
BeoCom 6000, Sales Training Brochure, date unknown.
Letter re: Bang & Olufsen A/S, by David Safran, Nixon Peabody, LLP, May 21, 2004.
Marriott et al., U.S. Appl. No. 10/722,948, filed Nov. 25, 2003.
Sylvania, "Intellivision™ Intelligent Television Master Component Service Manual," pp. 1, 2 and 8, 1979.
Bang & Olufsen Telecom a/s, "BeoCom 6000 User Guide 2000."
U.S. Appl. No. 10/060,712, filed Jan. 29, 2002.
U.S. Appl. No. 10/209,537, filed Jul. 30, 2002.
"Apple Unveils Optical Mouse and New Pro Keyboard," Press Release, Jul. 19, 2000.
"System Service and Troubleshooting Manual," www.dsplib.com/intv/Master, downloaded Dec. 11, 2002.
Kevin DeMeyer, "Crystal Optical Mouse," Feb. 14, 2002, Heatseekerz, Web-Article 19.
Communication pursuant to Article 96(2) EPC for corresponding EP Application No. 02 776 261.6 dated Apr. 13, 2006.
Notification of Reasons for Rejection for corresponding Japanese Application No. 2003-538879 dated Sep. 12, 2006, with translation.
Notification of Provision Rejection for corresponding Korean Application No. 10-2004-7005119 dated Aug. 29, 2006, with translation.
David H. Ahl, "Controller Update", Creative Computing vol. 9, No. 12, Dec. 1983, pp. 142-154.
"Atari VCS/2600 Peripherals", www.classicgaming.com, downloaded Feb. 28, 2007, pp. 1-15.
U.S. Appl. No. 11/610,376, entitled "Method and Apparatus for Use of Rotational User Inputs", filed Dec. 13, 2006.
U.S. Appl. No. 11/610,384, entitled "Method and Apparatus for Use of Rotational User Inputs", filed Dec. 13, 2006.
U.S. Appl. No. 10/256,716, entitled "Method and Apparatus for Accelerated Scrolling", filed Sep. 26, 2002.
U.S. Appl. No. 11/610,181, entitled "Method and Apparatus for Accelerated Scrolling", filed Dec. 13, 2006.
U.S. Appl. No. 11/610,190, entitled "Method and Apparatus for Accelerated Scrolling", filed Dec. 13, 2006.
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Kobayashi et al. (1997) "Dynamic Soundscape: Mapping Time to Space for Audio Browsing," Computer Human Interaction, pp. 194-201.
Kobayashi et al., "Development of the Touch Switches with the Click Response," Koukuu Denshi Gihou No. 17: pp. 44-48 (1994-3) (published by the Japan Aviation Electronics Indusrty, Ltd.); Translation of Summary.
Notification of Final Rejection for corresponding Koren Application No. 10-2004-7005119 dated Aug. 31, 2007 with translation.
"Alps Electric introduces the GlidePoint Wave Keyboard; combines a gently curved design with Alps' advanced GlidePoint Technology", Business Wire (Oct. 21, 1996).
Alps Electric Ships GlidePoint Keyboard for the Macintosh; Includes a GlidePoint Touchpad, Erase-Eaze Backspace Key and Contoured Wrist Rest, Business Wire, (Jul. 1, 1996).
"APS show guide to exhibitors", Physics Today, 49(3) (Mar. 1996).
"Design News literature plus", Design News, 51(24) (Dec. 18, 1995).
"Manufactures", Laser Focus World, Buyers Guide '96, 31(12) (Dec. 1995).
"National Design Engineering Show", Design News, 52(5) (Mar. 4, 1996).
"Preview of exhibitor booths at the Philadelphia show", Air Conditioning Heating & News, 200(2) (Jan. 13, 1997).
"Product news", Design News, 53(11) (Jun. 9, 1997).
"Product news", Design News, 53(9) (May 5, 1997).
Bartimo, Jim, "The Portables: Traveling Quickly", Computerworld (Nov. 14, 1983).
Brink et al., "Pumped-up portables", U.S. News & World Report, 116(21) (May 30, 1994).
Brown et al., "Windows on Tablets as a Means of Achieving Virtual Input Devices", Human-Computer Interaction - INTERACT '90 (1990).
Buxton et al., "Issues and Techniques in Touch-Sensitive Tablet Input", Computer Graphics, 19(3), Proceedings of SIGGRAPH '85 (1985).
Chen et al., "A Study in Interactive 3-D Rotation Using 2-D Control Devices", Computer Graphics 22(4) (Aug. 1988).
Evans et al., "Tablet-based Valuators that Provide One, Two, or Three Degrees of Freedom", Computer Graphics 15(3) (Aug. 1981).
Jesitus, John , "Broken promises?", Industry Week/IW, 246(20) (Nov. 3, 1997).
Nass, Richard, "Touchpad input device goes digital to give portable systems a desktop "mouse-like" feel", Electronic Design, 44(18) (Sep. 3, 1996).
Perenson, Melissa, "New & Improved: Touchpad Redux", PC Magazine (Sep. 10, 1996).
Petruzzellis, "Force-Sensing Resistors" Electronics Now, 64(3) (Mar. 1993).
Sony presents "Choice Without Compromise" at IBC '97 M2 PRESSWIRE (Jul. 24, 1997).
Spiwak, Marc, "A Great New Wireless Keyboard", Popular Electronics, 14(12) (Dec. 1997).
Spiwak, Marc, "A Pair of Unusual Controllers", Popular Electronics 14(4) (Apr. 1997).
Tessler, Franklin, "Point Pad", Macworld 12(10) (Oct. 1995).

Tessler, Franklin, "Smart Input: How to Chose from the New Generation of Innovative Input Devices", Macworld 13(5) (May 1996).
Tessler, Franklin, "Touchpads", Macworld 13(2) (Feb. 1996).
Soderholm, Lars G., "Sensing Systems for 'Touch and Feel'", Design News (May 8, 1989), pp. 72-76.
Baig, E.C., "Your PC Just Might Need a Mouse", U.S. News & World Report 108(22) (Jun. 4, 1990).
Mims, Forrest M., III, "A Few Quick Pointers; Mouses, Touch Screens, Touch Pads Light Pads, and The Like Can Make Your System Easier to Use", Computers & Electronics (22) (May 1984).
Peterson, Marty, "Koala Pad Touch Tablet & Micro Illustrator Software", InfoWorld (Oct. 10, 1983).
"Triax Custom Controllers due; Video Game Controllers", HFD-The Weekly Home Furnishing Newspaper, (67)(1) (Jan. 4, 1993).
"Apple Presents iPod Ultra-Portable MP3 Music Player Puts 1,000 Songs in Your Pocket", Press Release, Oct. 23, 2001, 3 pgs.
Communication pursuant to Article 96(2) EPC for corresponding EP Application No. 02 776 261.6 dated Jun. 28, 2007.

* cited by examiner

METHOD AND APPARATUS FOR USE OF ROTATIONAL USER INPUTS

CROSS-REFERENCE TO RELATED APPLICATIONS

This application claims benefit of priority from U.S. Provisional Patent Application No. 60/346,237, filed Oct. 22, 2001, entitled "METHOD AND SYSTEM FOR LIST SCROLLING," and is hereby incorporated by reference herein. This application also claims benefit of priority from U.S. Provisional Patent Application No. 60/359,551, filed Feb. 25, 2002, entitled "TOUCH PAD FOR HANDHELD DEVICE," and is hereby incorporated by reference herein. This application also claims benefit of priority from U.S. Provisional Patent Application No. 60/387,692, filed Jun. 10, 2002, entitled "METHOD AND APPARATUS FOR USE OF ROTATIONAL USER INPUTS," and is hereby incorporated by reference herein.

This application is also related to U.S. patent application Ser. No. 10/072,765, filed Feb. 7, 2002, and entitled "MOUSE HAVING A ROTARY DIAL," and hereby incorporated by reference herein.

BACKGROUND OF THE INVENTION

1. Field of the Invention

The present invention relates generally to a computing device and, more particularly, to a handheld computing device having a rotational input unit.

2. Description of the Related Art

There exist today many styles of input devices for performing operations with respect to a consumer electronic device. The operations generally correspond to moving a cursor and making selections on a display screen. By way of example, the input devices may include buttons, switches, keyboards, mice, trackballs, touch pads, joy sticks, touch screens and the like. Each of these devices has advantages and disadvantages that are taken into consideration when designing the consumer electronic device. In handheld computing devices, the input devices are typically buttons and switches. Buttons and switches are generally mechanical in nature and provide limited control with regard to the movement of a cursor (or other selector) and the making of selections. For example, they are generally dedicated to moving the cursor in a specific direction (e.g., arrow keys) or to making specific selections (e.g., enter, delete, number, etc.). In the case of handheld personal digital assistants (PDAs), the input devices tend to utilize touch-sensitive display screens. When using a touch screen, a user makes a selection on the display screen by pointing directly to objects on the screen using a stylus or finger.

In portable computing devices such as laptop computers, the input devices are commonly touch pads. With a touch pad, the movement of an input pointer (i.e., cursor) corresponds to the relative movements of the user's finger (or stylus) as the finger is moved along a surface of the touch pad. Touch pads can also make a selection on the display screen when one or more taps are detected on the surface of the touch pad. In some cases, any portion of the touch pad may be tapped, and in other cases, a dedicated portion of the touch pad may be tapped. In stationary devices such as desktop computers, the input devices are generally selected from keyboards, mice and trackballs. With a mouse, the movement of the input pointer corresponds to the relative movements of the mouse as the user moves the mouse along a surface. With a trackball, the movement of the input pointer corresponds to the relative movements of a ball as the user rotates the ball within a housing. Both mice and trackball devices generally include one or more buttons for making selections on the display screen.

In addition to allowing input pointer movements and selections with respect to a Graphical User Interface (GUI) presented on a display screen, the input devices may also allow a user to scroll across the display screen in the horizontal or vertical directions. For example, mice may include a scroll wheel that allows a user to simply roll the scroll wheel forward or backward to perform a scroll action. In addition, touch pads may provide dedicated active areas that implement scrolling when the user passes his or her finger linearly across the active area in the x and y directions. Both devices may also implement scrolling via horizontal and vertical scroll bars as part of the GUI. Using this technique, scrolling is implemented by positioning the input pointer over the desired scroll bar, selecting the desired scroll bar, and moving the scroll bar by moving the mouse or finger in the y direction (forwards and backwards) for vertical scrolling or in the x direction (left and right) for horizontal scrolling.

Further, consumer electronic products other than computers, such as cordless telephones, stereo receivers and compact-disc (CD) players, have used dials to enable users to select a phone number, a radio frequency and a specific CD, respectively. Here, typically, a limited-resolution display is used together with the dial. The display, at best, displays only a single item (number, frequency or label) in a low resolution manner using a character generator LCD. In other words, these devices have used single line, low resolution LCD readouts.

Thus, there is always a need for improved user input devices that facilitate greater ease of use of computing devices.

SUMMARY OF THE INVENTION

The present invention relates to improved approaches for users of computing devices to interact with graphical user interfaces. According to one aspect of the invention, a rotational user action supplied by a user at a user input device is transformed into linear action with respect to a graphical user interface. According to another aspect of the invention, a portion of an extended list of items is displayed by a graphical user interface and, through rotational user actions at a user input device, the portion of the list being displayed can be varied with welcomed ease of use. Although the type of computing device can vary, the invention is particularly well-suited for use with a media player.

The invention can be implemented in numerous ways, including as a method, system, device, apparatus, or computer readable medium. Several embodiments of the invention are discussed below.

As a portable media player, one embodiment of the invention includes at least: a storage disk drive that stores media content for each of a plurality of media items; a display screen that displays a portion of the media items at a time; a user input device that enables a user of the portable media player to at least select a particular media item from the plurality of media items through a rotational action with respect to the user input device; and a processor that controls the portable media player to play the media content of the particular media item that was selected using the user input device.

As a method for interacting with a graphical user interface produced on a display device of a computing device, one embodiment of the invention includes at least the operations of: receiving a rotational movement associated with a user input action; converting the rotational movement into a linear movement; and applying the linear movement to at least one object of the graphical user interface.

As a method for interacting with a graphical user interface produced on a display device of a computing device, one embodiment of the invention includes at least the operations of: displaying a portion of a list of items; receiving a rotational movement associated with a user input action; converting the rotational movement into a linear movement; determining a next portion of the list of items based on at least the linear movement; and displaying the next portion of the list of items.

As a computer readable medium including at least computer program code for interacting with a graphical user interface produced on a display device of a computing device, one embodiment of the invention includes at least: computer program code for receiving a rotational movement associated with a user input action; computer program code for converting the rotational movement into a linear movement; and computer program code for applying the linear movement to at least one object of the graphical user interface.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention relates to improved approaches for users of computing devices to interact with graphical user interfaces. According to one aspect of the invention, a rotational user action supplied by a user at a user input device is transformed into linear action with respect to a graphical user interface. According to another aspect of the invention, a portion of an extended list of items is displayed by a graphical user interface and, through rotational user actions at a user input device, the portion of the list being displayed can be varied with welcomed ease of use. Although the type of computing device can vary, the invention is particularly well-suited for use with a portable media player.

Other aspects of the invention will become apparent below. In any case, the aspects are not limiting and the various aspects of the invention can be used separately or in combination.

Embodiments of the invention are discussed below with reference to FIGS. 1A-6. However, those skilled in the art will readily appreciate that the detailed description given herein with respect to these figures is for explanatory purposes as the invention extends beyond these limited embodiments.

Figure 1A:
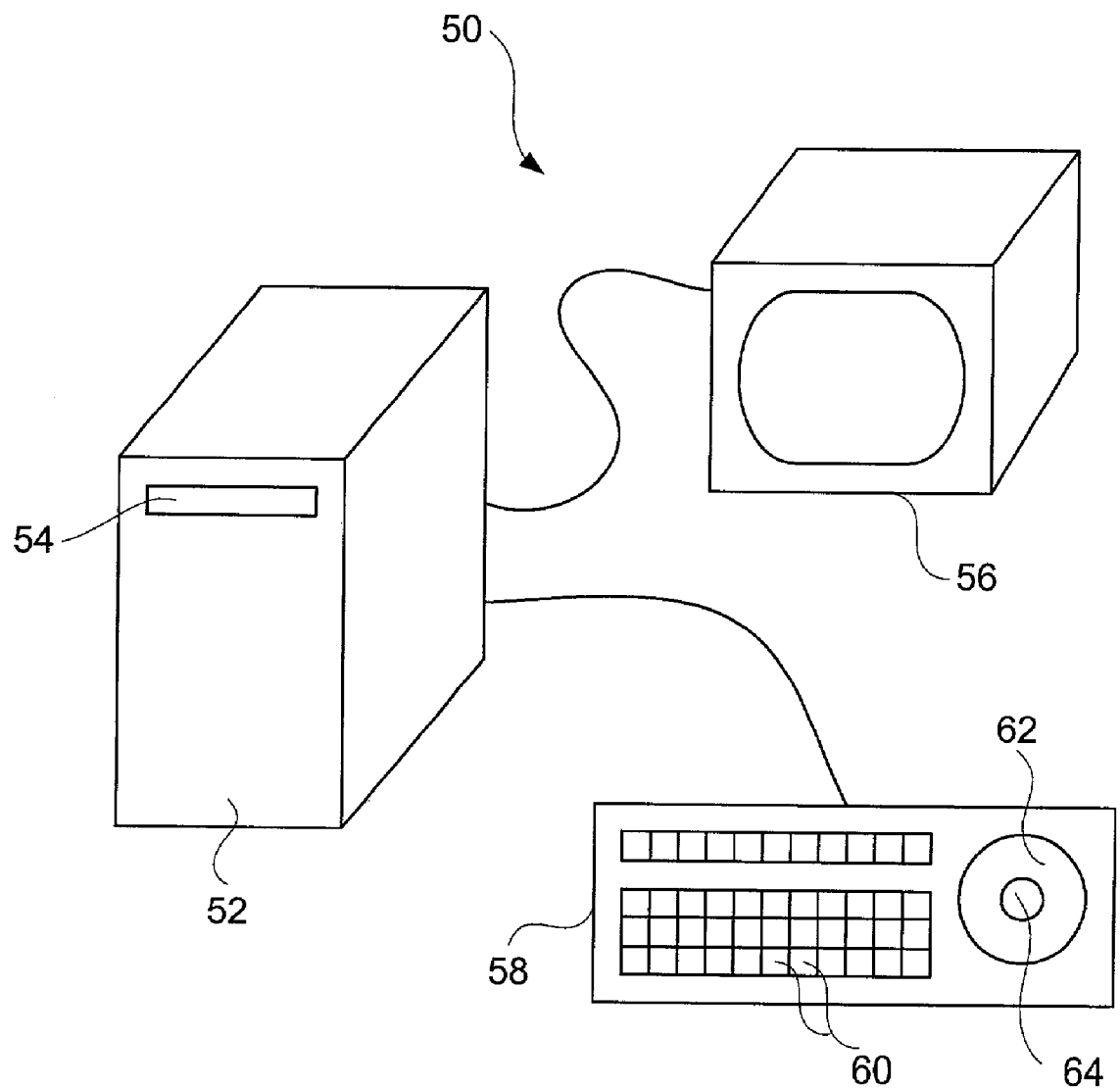
FIG. 1A is a perspective diagram of a computer system in accordance with one embodiment of the invention.

FIG. 1A is a perspective diagram of a computer system 50 in accordance with one embodiment of the invention. The computer system 50 includes a base housing 52 that encloses electronic circuitry that performs the computing operations for the computing system 50. Typically, the electronic circuitry includes a microprocessor, memory, I/O controller, graphics controller, etc. The housing 52 also provides a removable computer readable medium drive 54 in which a removable computer readable medium can be placed so as to electronically or optically read data therefrom. The computer housing 52 is also coupled to a display device 56 on which a screen display can be presented for a user of the computer system 50 to view. Still further, the computer system 50 includes a keyboard apparatus 58. The keyboard apparatus 58 allows a user to interact with a computer program (application program or operating system) performed by the computer system 50. In this regard, the keyboard apparatus 58 includes a plurality of keys 60 and a rotational input unit 62. The rotational input unit 62 allows a user to perform a rotational movement with respect to the rotational input unit 62. The rotational movement can then be processed by the electronic circuitry of the computer system 50 and used to manipulate navigation or selection actions with respect to a graphical user interface being presented to the user on the display device 56. The keyboard apparatus 58 can also include a button 64 associated with the rotational input unit 62. As shown in FIG. 1A, the button 64 can be provided at a center region of the rotational input unit 62. However, the button 64 can be placed elsewhere, such as outside the periphery of the rotational input unit 62.

Figure 1B:
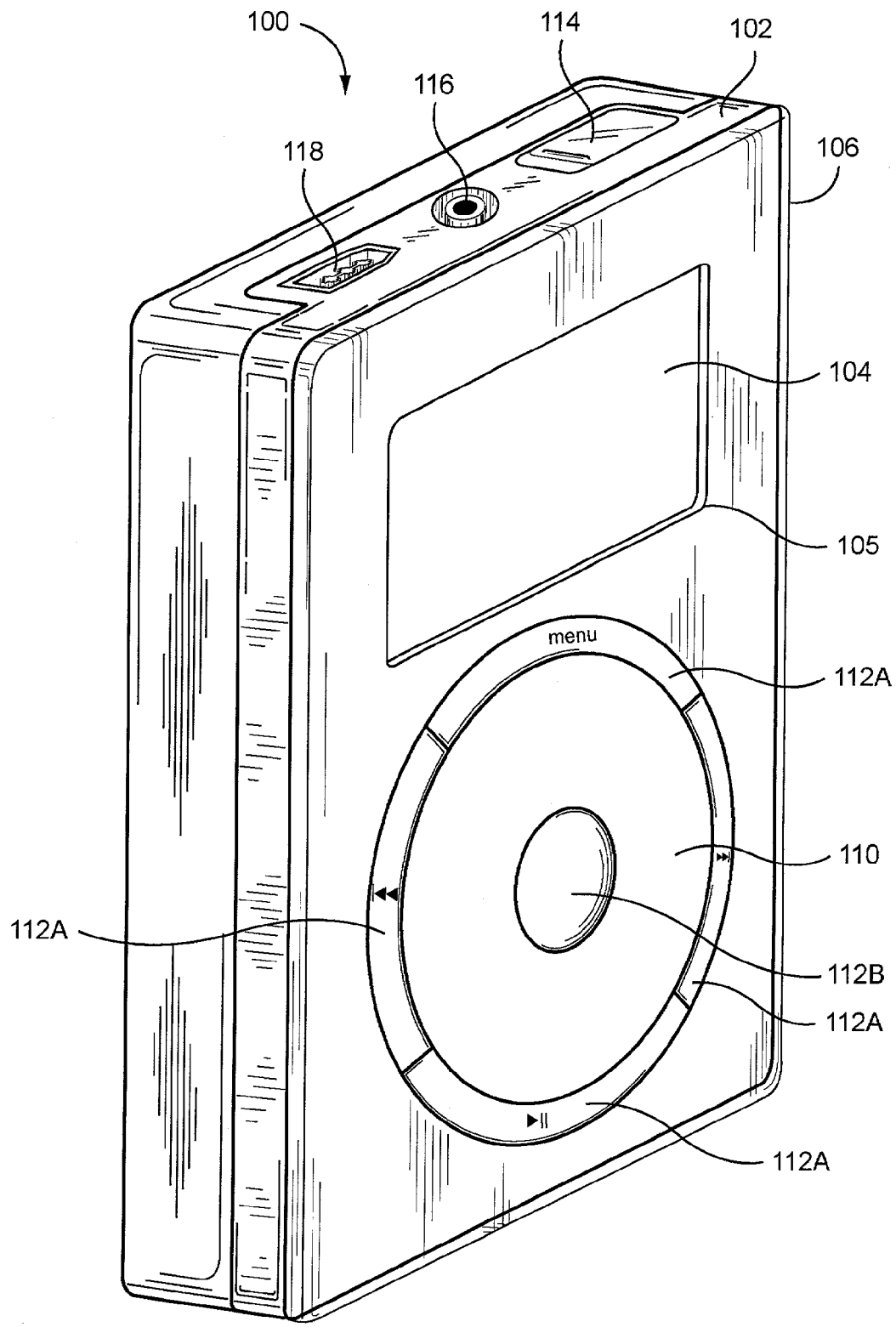
FIG. 1B is a perspective diagram of a media player in accordance with one embodiment of the present invention.

FIG. 1B is a perspective diagram of a media player 100 in accordance with one embodiment of the present invention. The term "media player" generally refers to computing devices that are dedicated to processing media such as audio, video or other images. In one implementation, the media player is a portable computing device. Examples of media players include music players, game players, video players, video recorders, cameras and the like. These computing devices are generally portable so as to allow a user to listen to music, play games or video, record video or take pictures wherever the user travels. In one embodiment, the media player is a handheld device that is sized for placement into a pocket of the user (i.e., pocket-sized). By being pocket-sized, the user does not have to directly carry the device and therefore the device can be taken almost anywhere the user travels (e.g., the user is not limited by carrying a large, bulky and often heavy device, as in a portable computer). For example, in the case of a music player (e.g., MP3 player), a user may use the device while working out at the gym. In the case of a camera, a user may use the device while mountain climbing. Furthermore, the device may be operated by the user's hands, no reference surface such as a desktop is needed. In one implementation, the music player can be pocket-sized and rather lightweight (e.g., dimensions of 2.43 by 4.02 by 0.78 inches and a weight of 6.5 ounces) for true portability.

The media player 100 typically has connection capabilities that allow a user to upload and download data to and from a host device such as a general purpose computer (e.g., desktop computer or portable computer). For example, in the case of a camera, photo images may be downloaded to the general purpose computer for further processing (e.g., printing). With regard to music players, songs and playlists stored on the general purpose computer may be downloaded into the music player. In one embodiment, the media player 100 can be a pocket-sized handheld MP3 music player that allows a user to store a large collection of music.

As shown in FIG. 1B, the media player 100 includes a housing 102 that encloses various electrical components (including integrated circuit chips and other circuitry) to provide computing capabilities for the media player 100. The integrated circuit chips and other circuitry may include a microprocessor, memory (e.g., ROM or RAM), a power source (e.g., a battery), a circuit board, a hard drive, and various input/output (I/O) support circuitry. In the case of music players, the electrical components may include components for outputting music such as an amplifier and a digital signal processor (DSP). In the case of video recorders or cameras, the electrical components may include components for capturing images such as image sensors (e.g., charge-coupled device (CCD) or complimentary oxide semiconductor (CMOS)) or optics (e.g., lenses, splitters, filters). The housing may also define the shape or form of the media player. That is, the contour of the housing 102 may embody the outward physical appearance of the media player 100.

The media player 100 also includes a display screen 104. The display screen 104 is used to display a Graphical User Interface (GUI) as well as other information to the user (e.g., text, objects, graphics). By way of example, the display screen 104 may be a liquid crystal display (LCD). In one particular embodiment, the display screen corresponds to a high-resolution display with a white LED backlight to give clear visibility in daylight as well as in low-light conditions. Additionally, according to one embodiment, the display screen 104 can be about 2 inches (measured diagonally) and provide a 160-by-128 pixel resolution. The display screen 104 can also operate to simultaneously display characters of multiple languages. As shown in FIG. 1B, the display screen 104 is visible to a user of the media player 100 through an opening 105 in the housing 102, and through a transparent wall 106 that is disposed over the opening 105. Although transparent, the transparent wall 106 may be considered part of the housing 102 since it helps to define the shape or form of the media player 100.

The media player 100 includes a rotational input device 110. The rotational input device 110 receives a rotational input action from a user of the media player 100. The rotational input action is used to control one or more control functions for controlling or interacting with the media player 100 (or application operating thereon). In one embodiment, the control function corresponds to a scrolling feature. The direction of scrolling can vary depending on implementation. For example, scrolling may be implemented vertically (up or down) or horizontally (left or right). For example, in the case of a music player, the moving finger may initiate a control function for scrolling through a song menu displayed on the display screen 104. The term "scrolling" as used herein generally pertains to moving displayed data (e.g., text or graphics) across a viewing area on a display screen 104 so that a new item of data (e.g., line of text or graphics) is brought into view in the viewing area. In most cases, once the viewing area is full, each new item of data appears at the edge of the viewing area and all other sets of data move over one position. That is, the new item of data appears for each item of data that moves out of the viewing area. In essence, the scrolling function allows a user to view consecutive sets of data currently outside of the viewing area. The viewing area may be the entire viewing area of the display screen 104 or it may be only a portion of the display screen 104 (e.g., a window frame).

By way of example, in the case of a music player (e.g., MP3 player), the scrolling feature may be used to help browse through songs stored in the music player. To elaborate, the display screen 104, during operation, may display a list of media items (e.g., songs). A user of the media player 100 is able to linearly scroll through the list of media items by providing a rotational input action using the rotational input device 110. The displayed items from the list of media items are varied commensurate with the rotational input action such that the user is able to effectively scroll through the list of media items. However, since the list of media items can be rather lengthy, the invention provides the ability for the user to rapidly traverse (or scroll) through the list of media items. In effect, the user is able to accelerate their traversal of the list of media items by providing the rotational input action at greater speeds. The direction of the rotational input action may be arranged to control the direction of scrolling.

In addition to above, the media player 100 may also include one or more buttons 112. The buttons 112 are configured to provide one or more dedicated control functions for making selections or issuing commands associated with operating the media player 100. By way of example, in the case of a music player, the button functions may be associated with opening a menu, playing a song, fast forwarding a song, seeking through a menu and the like. In most cases, the button functions are implemented via a mechanical clicking action. The position of the buttons 112 relative to the rotational input device 110 may be widely varied. For example, they may be adjacent to one another or spaced apart. In the illustrated embodiment, the buttons 112 are configured to surround the inner and outer perimeter of the rotational input device 110. In this manner, the buttons 112 may provide tangible surfaces that define the outer boundaries of the rotational input device 110. As shown, there are four buttons 112A that surround the outer perimeter and one button 112B disposed in the center or middle of the rotational input device 110. By way of example, the plurality of buttons 112 may consist of a menu button, play/stop button, forward seek button, reverse seek button, and the like.

Moreover, the media player 100 may also include a power switch 114, a headphone jack 116 and a data port 118. The power switch 114 is configured to turn the media device 100 on and off. The headphone jack 116 is capable of receiving a headphone connector associated with headphones configured for listening to sound being outputted by the media device 100. The data port 118 is capable of receiving a data connector/cable assembly configured for transmitting and receiving data to and from a host device, such as a general purpose computer. By way of example, the data port 118 may be used to upload or download songs to and from the media device 100. The data port 118 may be widely varied. For example, the data port may be a PS/2 port, a serial port, a parallel port, a USB port, a FireWire port, and the like. In some cases, the data port 118 may be a radio frequency (RF) link or optical infrared (IR) link to eliminate the need for a cable. Although not shown in FIG. 1, the media player 100 may also include a power port that receives a power connector/cable assembly configured for delivering power to the media player 100. In some cases, the data port 118 may serve as both a data and a power port.

Figure 2A:
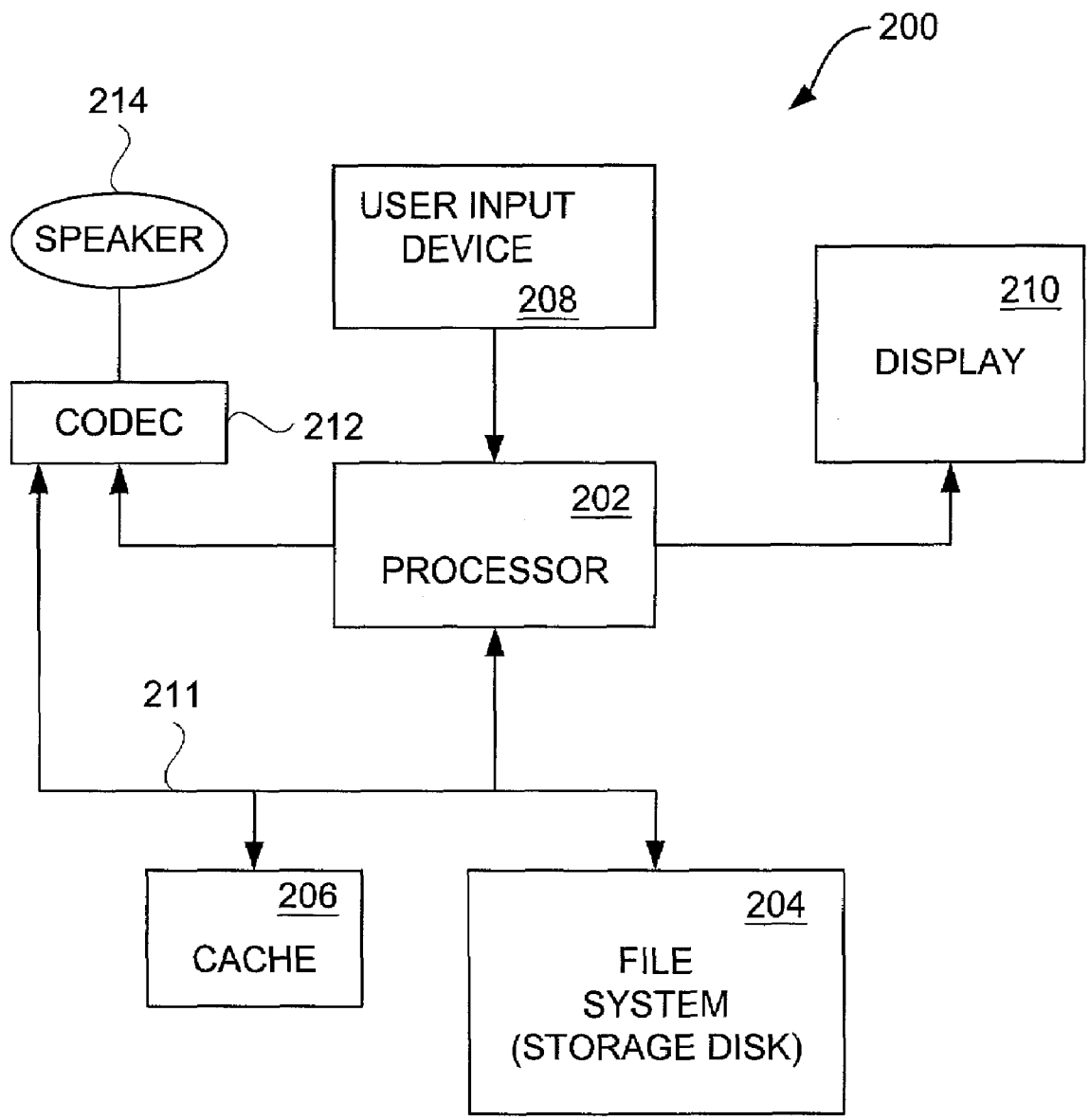
FIG. 2A is a block diagram of a media player according to one embodiment of the invention.

FIG. 2A is a block diagram of a media player 200 according to one embodiment of the invention. The media player 200 can, for example, represent internal components of the media player 100.

The media player 200 includes a processor 202 that pertains to a microprocessor or controller for controlling the overall operation of the media player 200. The media player 200 stores media data pertaining to media items in a file system 204 and a cache 206. The file system 204 is, typically, a storage disk or a plurality of disks. The file system typically provides high capacity storage capability for the media player 200. However, since the access time to the file system 204 is relatively slow, the media player 200 also includes a cache 206. The cache 206 is, for example, Random-Access Memory (RAM) provided by semiconductor memory. The relative access time to the cache 206 is substantially shorter than for the file system 204. However, the cache 206 does not have the large storage capacity of the file system 204. Further, the file system 204, when active, consumes more power than does the cache 206. The power consumption is particularly important when the media player 200 is a portable media player that is powered by a battery (not shown).

The media player 200 also includes a user input device 208 that allows a user of the media player 200 to interact with the media player 200. For example, the user input device 208 can take a variety of forms, such as a button, keypad, dial, etc. Still further, the media player 200 includes a display 210 (screen display) that can be controlled by the processor 202 to display information to the user. A data bus 211 can facilitate data transfer between at least the file system 204, the cache 206, the processor 202, and the coder/decoder (CODEC) 212. The media player 200 can also include an audio feedback unit (not shown) to provide audio feedback for user interactions (such as with the user input device 208).

In one embodiment, the media player 200 serves to store a plurality of media items (e.g., songs) in the file system 204. When a user desires to have the media player play a particular media item, a list of available media items is displayed on the display 210. Then, using the user input device 208, a user can select one of the available media items. The processor 202, upon receiving a selection of a particular media item, supplies the media data (e.g., audio file) for the particular media item to a coder/decoder (CODEC) 212. The CODEC 212 then produces analog output signals for a speaker 214. The speaker 214 can be a speaker internal to the media player 200 or external to the media player 200. For example, headphones or earphones that connect to the media player 200 would be considered an external speaker.

Figure 2B:
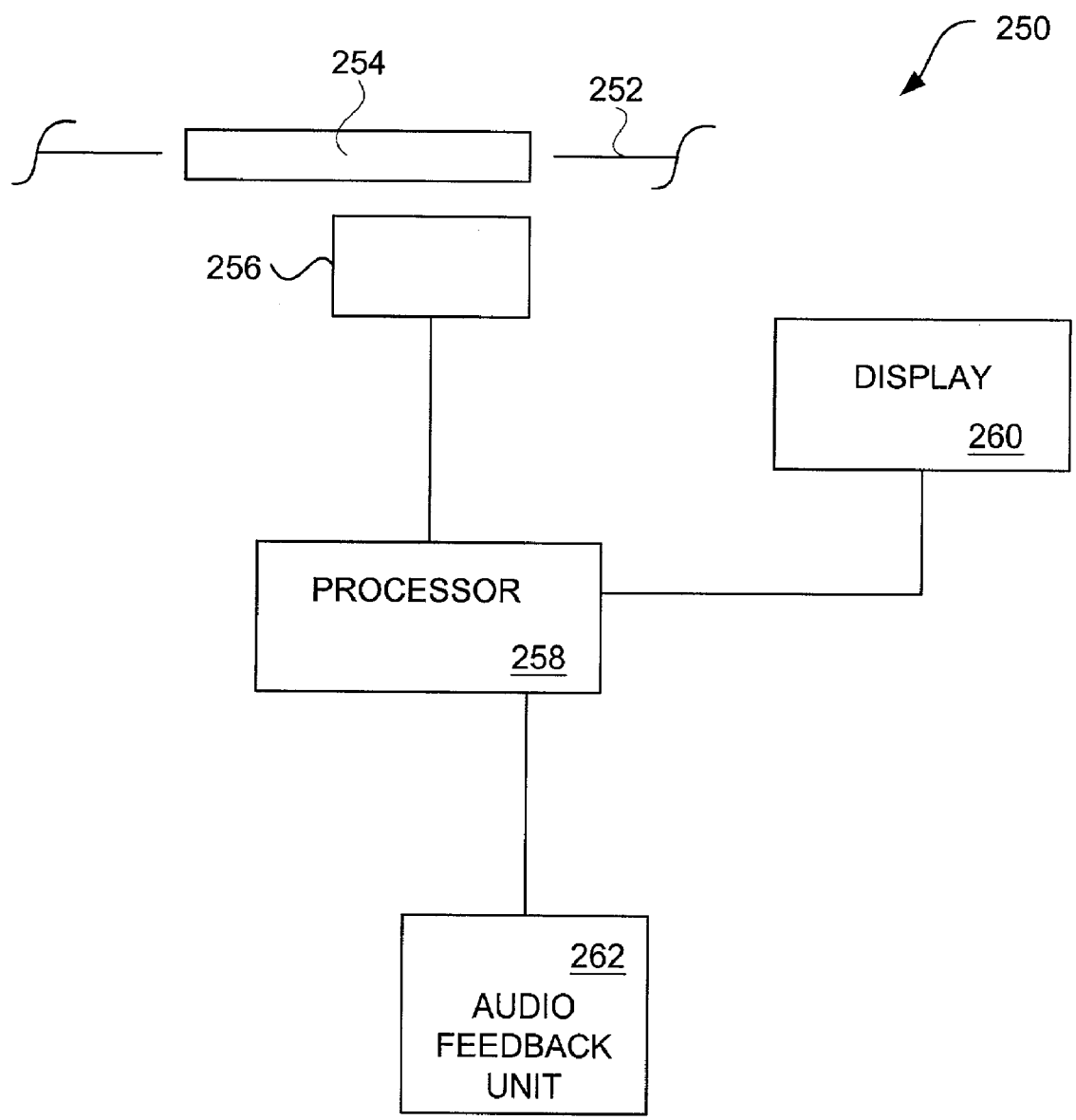
FIG. 2B is a block diagram of a computing system according to one embodiment of the invention.

FIG. 2B is a block diagram of a computing system 250 according to one embodiment of the invention. The computing system 250 can, for example, represent a portion of any of the computer system 50 shown in FIG. 1A, the media player 100 shown in FIG. 1B, or the media player 200 shown in FIG. 2A.

The computing system 250 includes a housing 252 that exposes a rotational input device 254. The housing 252 can be a computer's housing or an input/output device's housing. The rotational input device 254 permits a user to interact with the computing system 250 through a rotational action.

The rotational action results from either rotation of the rotational input device 254 itself or rotation of a stylus or user's finger about the rotational input device 254. As examples, the rotational input device 254 can be a rotary dial (including, e.g., a navigational wheel or a scroll wheel) capable of being rotated or a touch pad capable of rotational sensing. A rotation pickup unit 256 couples to the rotational input device 254 to sense the rotational action. For example, the rotational pickup unit 256 can be optically or electrically coupled to the rotational input device 254.

The computing system 250 further includes a processor 258, a display 260 and an audio feedback unit 262. Signals pertaining to the rotational action are supplied to the processor 258. The processor 258 not only performs processing operations for application programs hosted by the computing system 250 but also can control the display 260 and the audio feedback unit 262. Alternatively, a specialized controller or other circuitry can support the processor 258 in controlling the display 260 or the audio feedback unit 262.

The processor 258 causes a display screen to be produced on the display 260. In one implementation, the display screen includes a selectable list of items (e.g., media items) from which a user may select one or more of the items. By the user providing a rotational action with respect to the rotational input device 254, the list can be scrolled through. The processor 258 receives the signals pertaining to the rotational action from the rotation pickup unit 256. The processor 258 then determines the next items of the list that are to be presented on a display screen by the display 260. In making this determination, the processor 258 can take into consideration the length of the list. Typically, the processor 258 will determine the rate of the rotational action such that the transitioning to different items in the media list can be performed at a rate proportional to the rate of the rotational action.

The processor 258 can also control the audio feedback unit 266 to provide audio feedback to a user. The audio feedback can, for example, be a clicking sound produced by the audio feedback unit 262. In one embodiment, the audio feedback unit 262 is a piezoelectric buzzer. As the rate of transitioning through the list of items increases, the frequency of the clicking sounds can increase. Alternatively, when the rate that the rotational input device 254 is turned slows, the rate of transitioning through the list of items decreases, and thus the frequency of the clicking sounds correspondingly slows. Hence, the clicking sounds provide audio feedback to the user as to the rate in which the items (i.e., media items) within the list of items are being traversed.

Figure 3:
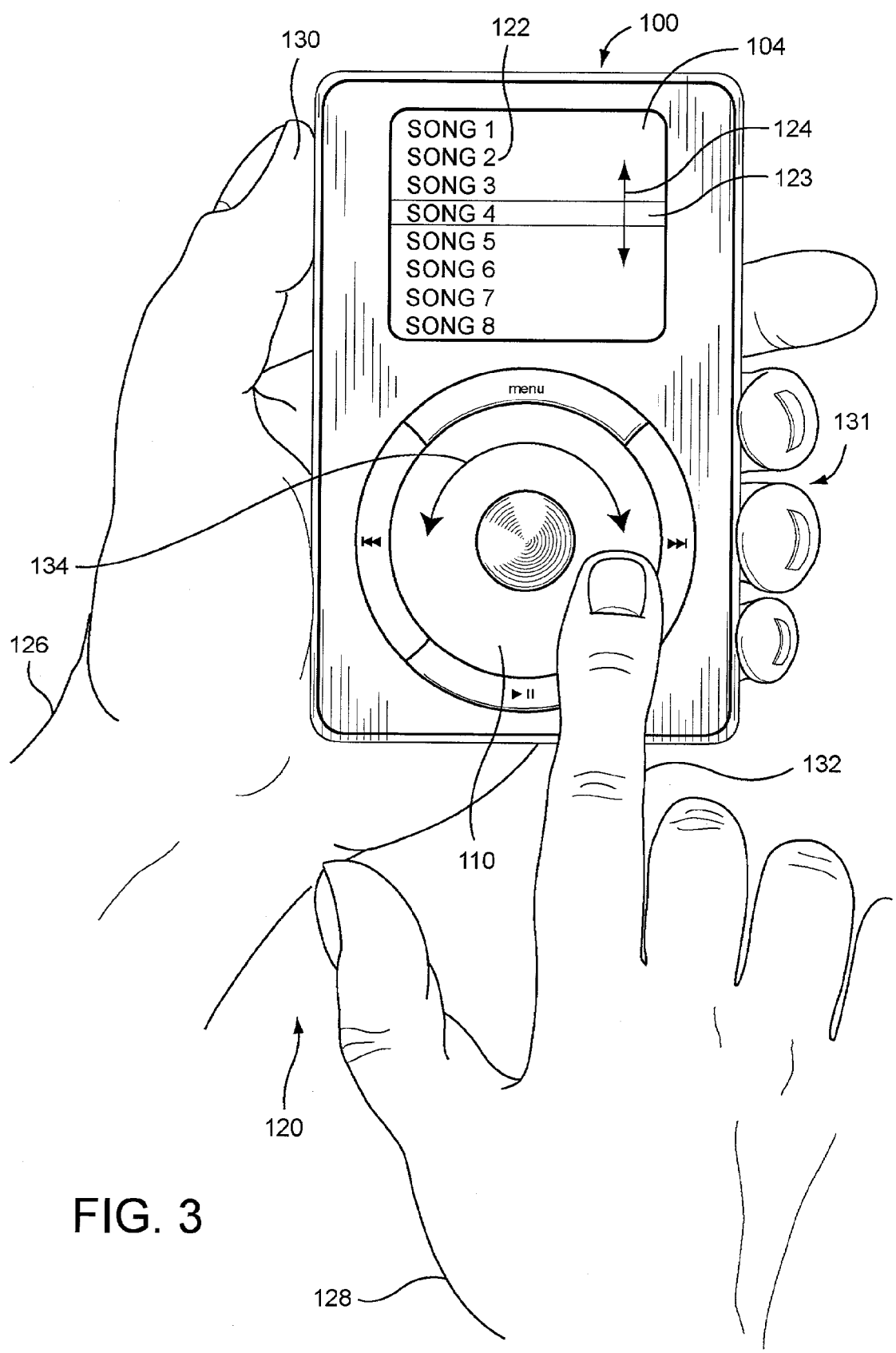
FIG. 3 shows the media player of FIG. 1B being used by a user in accordance with one embodiment of the invention.

FIG. 3 shows the media player 100 of FIG. 1B being used by a user 120 in accordance with one embodiment of the invention. In this embodiment, the user 120 is linearly scrolling (as shown by arrow 124) through a list of songs 122 displayed on the display screen 104 via a slider bar 123. As shown, the media device 100 is comfortably held in one hand 126 while being comfortably addressed by the other hand 128. This configuration generally allows the user 120 to easily actuate the rotational input device 110 with one or more fingers. For example, the thumb 130 and right-most fingers 131 (or left-most fingers if left handed) of the first hand 126 are used to grip the sides of the media player 100 while a finger 132 of the opposite hand 128 is used to actuate the rotational input device 110.

Referring to FIG. 3, and in accordance with one embodiment of the invention, the rotational input device 110 can be continuously actuated by a circular motion of the finger 132 as shown by arrow 134. For example, the finger may rotate relative to an imaginary axis. In particular, the finger can be rotated through 360 degrees of rotation without stopping. This form of motion may produce continuous or incremental scrolling through the list of songs 122 being displayed on the display screen 104.

Figure 4A:
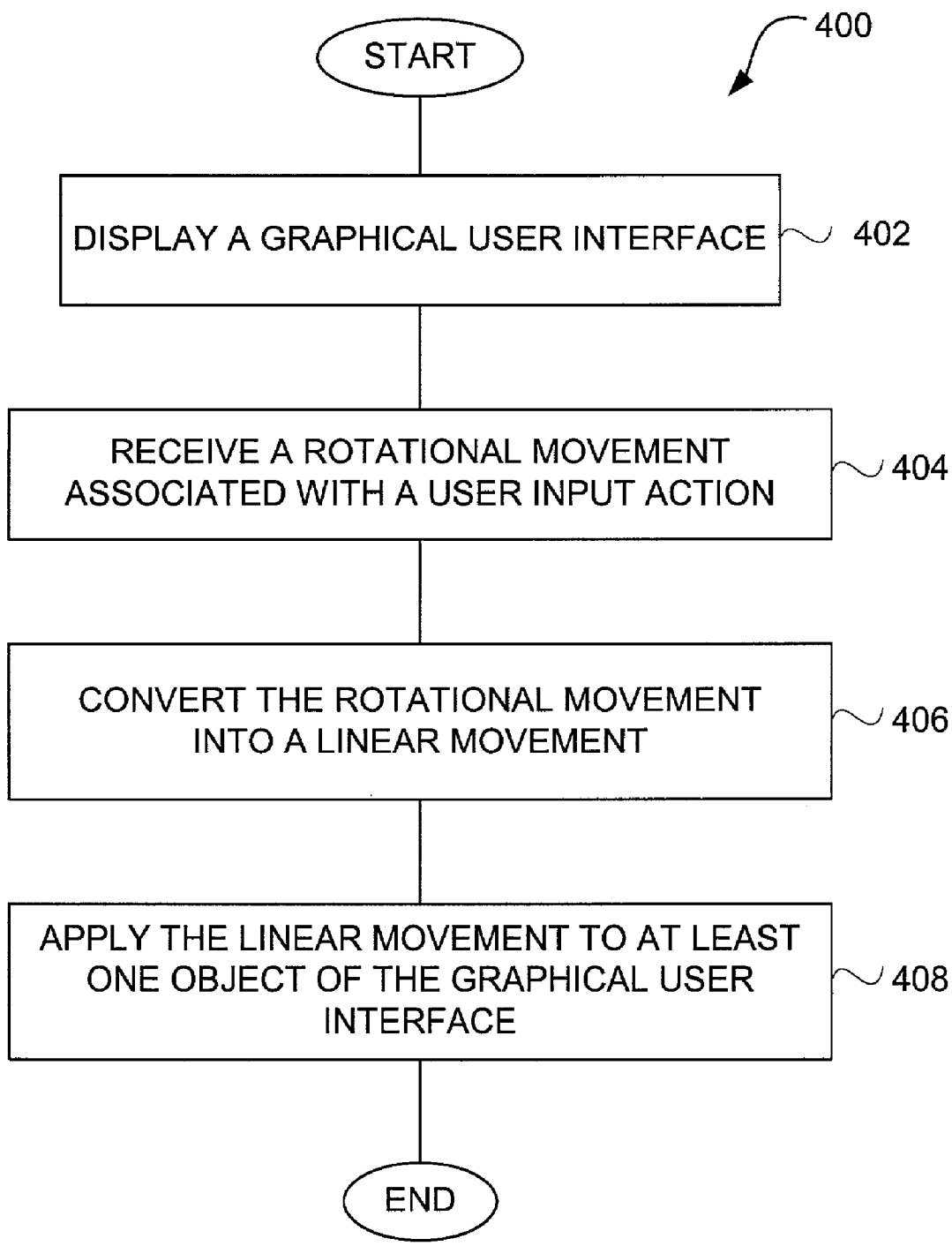
FIG. 4A is a flow diagram of user input processing according to one embodiment of the invention.

FIG. 4A is a flow diagram of user input processing 400 according to one embodiment of the invention. The user input processing 400 is, for example, performed with respect to the computer system 50 illustrated in FIG. 1A or the media player 100 illustrated in FIG. 1B.

The user input processing 400 displays 402 a graphical user interface. Then, a rotational movement associated with a user input action is received 404. Here, the user input action is generally angular, as opposed to linear, and thus pertains to a rotational movement. As discussed in more detail below, the rotational movement can be provided by the user input action. In one example, the rotational movement can be caused by a user acting to rotate a navigational wheel through a user input action. In another example, the rotational movement can be caused by a user's finger or a stylist being moved in a rotational manner through a user input action with respect to a touch pad. After the rotational movement has been received 404, the rotational movement is converted 406 into a linear movement. The linear movement is then applied 408 to at least one object of the graphical user interface. For example, the object of the graphical user interface can be a list, menu or other object having a plurality of selectable items. The linear movement can effect a scroll type action with respect to the object (e.g., list or menu). Alternatively, the linear movement can effect a level adjustment (e.g., volume adjustment). After the linear movement has been applied 408, the user input processing 400 is complete and ends.

Figure 4B:
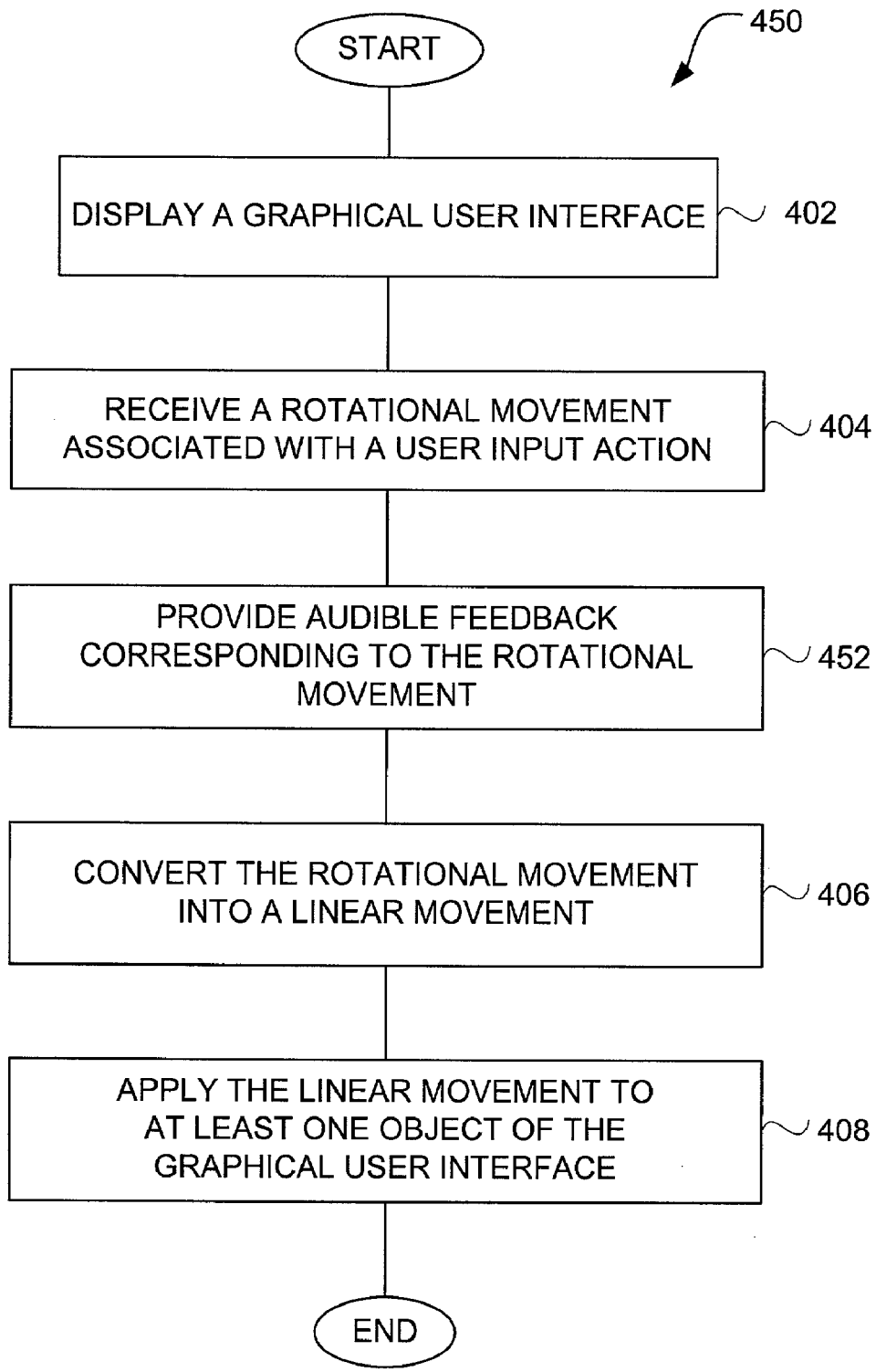
FIG. 4B is a flow diagram of user input processing according to another embodiment of the invention.

FIG. 4B is a flow diagram of user input processing 450 according to another embodiment of the invention. The user input processing 450 is, for example, performed with respect to the computer system 50 illustrated in FIG. 1A or the media player 100 illustrated in FIG. 1B.

The operations 402-408 performed by the user input processing 450 are similar to those like operations performed by the user input processing 400 illustrated in FIG. 4A. Additionally, the user input processing 450 operates to provide 452 audible feedback corresponding to the rotational movements. In other words, as the rotational movement associated with user input action is received 404, audible feedback corresponding to the rotational movement is provided 452. Such audible feedback provides the user with feedback concerning the extent to which rotational movement has been input. In one embodiment, the rotational movement associated with user input action is converted into linear movement and applied to an object of a graphical user interface. For example, when the object of the graphical user interface is a multi-item list that is displayed for user scrolling and selection actions, the rotational movement associated with the user input action represents a distance traversed in the multi-item list. In one embodiment, the audible feedback is provided through a piezoelectric buzzer that is controlled by a processor (or other circuitry). For example, the audio feedback unit 262 shown in FIG. 2B can be a piezoelectric buzzer. The controller for the piezoelectric buzzer can, for example, be a processor of the computer system 50 or the media player 100, or some other circuitry coupled to the piezoelectric buzzer.

Figure 5:
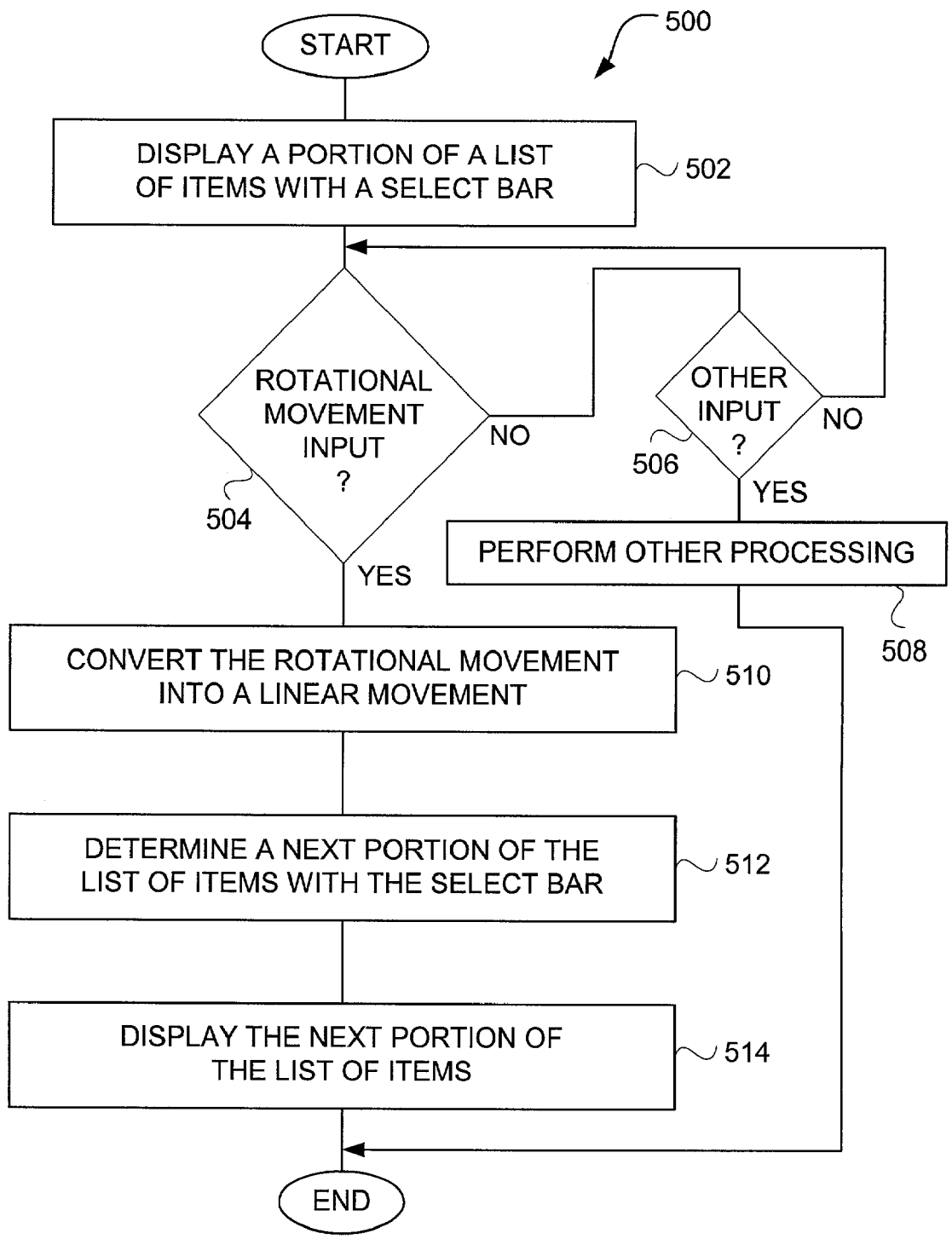
FIG. 5 is a flow diagram of user input processing according to another embodiment of the invention.

FIG. 5 is a flow diagram of user input processing 500 according to another embodiment of the invention. The user input processing 500 is, for example, performed by a computing device, such as the computer system 50 illustrated in FIG. 1A or the media player 100 illustrated in FIG. 1B.

The user input processing 500 begins by the display 502 of a portion of a list of items together with a select bar. The select bar typically points to or highlights one or more of the items of the list of items. In general, the select bar can be associated with any sort of visual indication specifying one or more of the items of the list of items. Hence, the select bar is one type of visual indicator. Next, a decision 504 determines whether a rotational movement input has been received. When the decision 504 determines that a rotational movement input has not yet been received, then a decision 506 determines whether another input has been received. Here, the inputs are provided by a user of the computing device performing or associated with the user input processing 500. When the decision 506 determines that another input has been received, then other processing is performed 508 to perform any operations or actions caused by the other input. Following the operation 508, the user input processing 500 is complete and ends. On the other hand, when the decision 506 determines that no other input has been received, then the user input processing 500 returns to repeat the decision 504.

Once the decision 504 determines that a rotational movement input has been received, then the rotational movement is converted 510 to a linear movement. Then, a next portion of the list of items (and placement of the select bar over one of the items) is determined 512. Thereafter, the next portion of the list of items is displayed 514. The linear movement operates to move the select bar (or other visual identifier) within the list. In other words, the select bar is scrolled upwards or downwards by the user in accordance with the linear motion. As the scrolling occurs, the portion of the list being displayed changes. Following the operation 514, the user input processing 500 is complete and ends. However, if desired, the user input processing 500 can continue following operation 514 by returning to the decision 504 such that subsequent rotational movement inputs can be processed to view other portions of the list items in a similar manner.

Figure 6:
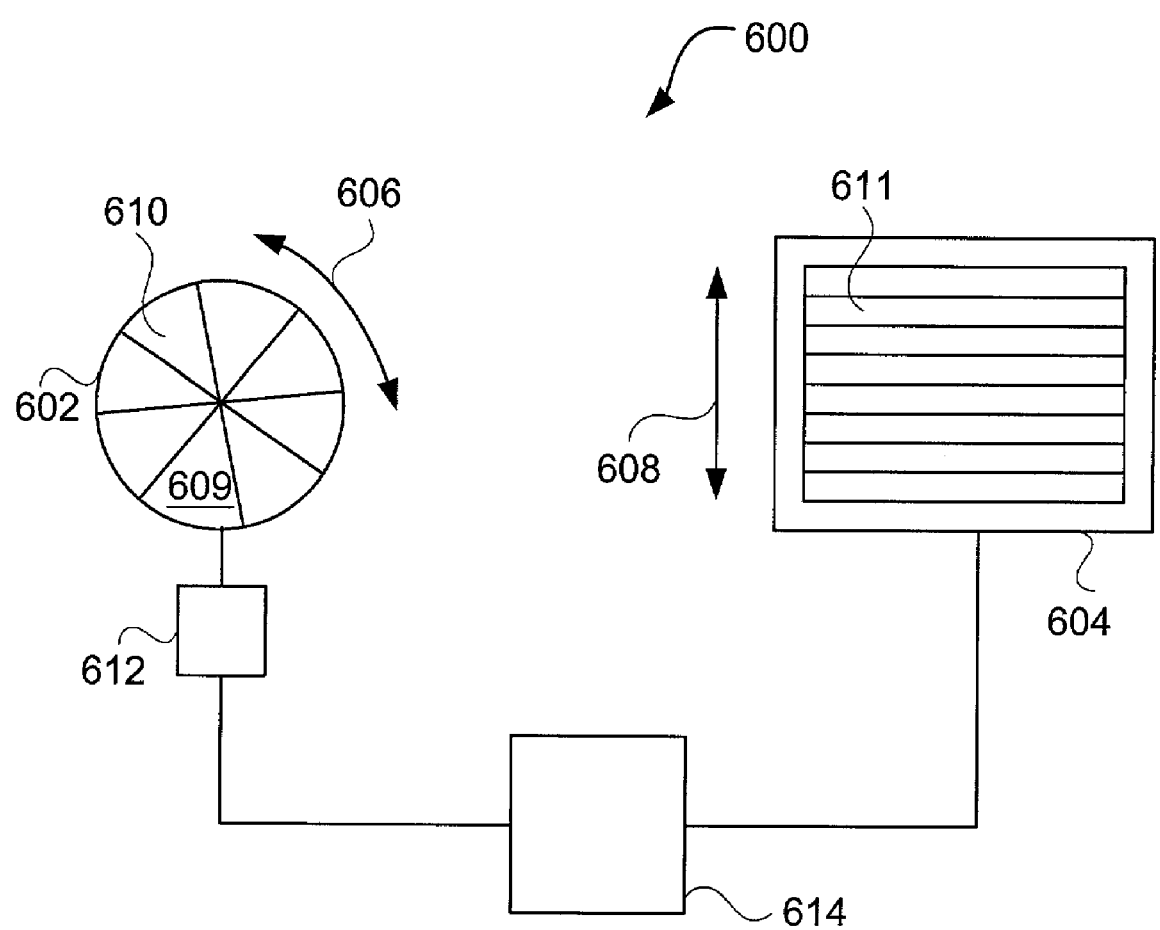
FIG. 6 is a block diagram of a rotary input display system in accordance with one embodiment of the invention.

FIG. 6 is a block diagram of a rotary input display system 600 in accordance with one embodiment of the invention. By way of example, the rotary input display system 600 can be performed by a computing device, such as the computer system 50 illustrated in FIG. 1A or the media player 100 illustrated in FIG. 1B. The rotary input display system 600 utilizes a rotational input device 602 and a display screen 604. The rotational input device 602 is configured to transform a rotational motion 606 by a user input action (e.g., a swirling or whirling motion) into translational or linear motion 608 on the display screen 604. In one embodiment, the rotational input device 602 is arranged to continuously determine either the angular position of the rotational input device 602 or the angular position of an object relative to a planar surface 609 of the rotational input device 602. This allows a user to linearly scroll through a media list 611 on the display screen 604 by inducing the rotational motion 606 with respect to the rotational input device 602.

The rotary input display system 600 also includes a control assembly 612 that is coupled to the rotational input device 602. The control assembly 612 is configured to acquire the position signals from the sensors and to supply the acquired signals to a processor 614 of the system. By way of example, the control assembly 612 may include an application-specific integrated circuit (ASIC) that is configured to monitor the signals from the sensors to compute the angular location and direction (and optionally speed and acceleration) from the monitored signals and to report this information to the processor 614.

The processor 614 is coupled between the control assembly 612 and the display screen 604. The processor 614 is configured to control display of information on the display screen 604. In one sequence, the processor 614 receives angular motion information from the control assembly 612 and then determines the next items of the media list 611 that are to be presented on the display screen 604. In making this determination, the processor 614 can take into consideration the length of the media list 611. Typically, the processor 614 will determine the rate of movement such that the transitioning to different items in the media list 611 can be performed faster when moved at greater speeds. In effect, to the user, the more rapid the rotational motion or acceleration, the faster the transitioning through the list of media items 611. Alternatively, the control assembly 612 and processor 614 may be combined in some embodiments.

Although not shown, the processor 614 can also control a buzzer to provide audio feedback to a user. The audio feedback can, for example, be a clicking sound produced by a buzzer 616. In one embodiment, the buzzer 616 is a piezoelectric buzzer. As the rate of transitioning through the list of media items increases, the frequency of the clicking sounds increases. Alternatively, when the rate of transitioning slows, the frequency of the clicking sounds correspondingly slows. Hence, the clicking sounds provide audio feedback to the user as to the rate in which the media items within the list of media items are being traversed.

The various aspects or features of the invention described above can be used alone or in various combinations. The invention is preferably implemented by a combination of hardware and software, but can also be implemented in hardware or software. The invention can also be embodied as computer readable code on a computer readable medium. The computer readable medium is any data storage device that can store data which can thereafter be read by a computer system. Examples of the computer readable medium include read-only memory, random-access memory, CDROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. It should be noted that this is not an exhaustive list and there may be other advantages which are not described herein. One advantage of the invention is that a user is able to traverse through a displayed list of items (e.g., media items) using a rotational user input action. Another advantage of the invention is that a user is able to easily and rapidly traverse a lengthy list of items (e.g., media items).

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A portable media player, comprising:
   a storage device that stores media content for each of a plurality of media items;
   a display screen that displays a portion of the media items at a time;
   a user input device having an exposed upper surface that enables a user of said portable media player to at least identify a particular media item from the media items being displayed through a rotational action with respect to the exposed upper surface of said user input device, wherein said user input device comprises a rotary dial and a button, and wherein the button is provided at the center of the rotary dial; and
   a processor operatively connected to said storage device and said user input device, said processor controls said portable media player to play the media content of the particular media item that was identified using said user input device,
   wherein, responsive to the rotational action with respect to the exposed upper surface of said user input device, visual feedback is provided on said display screen.

2. A portable media player as recited in claim 1, wherein said portable media player is battery-operated.

3. A portable media player as recited in claim 2, wherein said portable media player is pocket-sized.

4. A portable media player as recited in claim 1, wherein said processor further controls said portable media player to receive annular inputs directly from said user input device.

5. A portable media player as recited in claim 4, wherein said storage device is a storage disk drive.

6. A portable media player as recited in claim 1, wherein said display screen is a liquid crystal display with a light-emitting diode backlight.

7. A portable media player as recited in claim 6, wherein the light-emitting diode is white.

8. A portable media player as recited in claim 1, wherein said display screen is a pixel-based display device.

9. A portable media player as recited in claim 1, wherein said portable media player comprises an audio player, and wherein the media content for the media items includes at least audio files of songs.

10. A portable media player as recited in claim 1, wherein said portable media player comprises a video player, and wherein the media content for the media items includes at least video files of videos.

11. A portable media player as recited in claim 1, wherein said portable media player comprises an image viewer, and wherein the media content for the media items includes at least image files of images.

12. A portable media player as recited in claim 1, wherein only a single finger of the user need be used to provide the rotational action with respect to the exposed upper surface of said user input device, and the single finger can be used to complete one or more revolutions of said user input device without lifting the finger from said user input device.

13. A method for interacting with a graphical user interface produced on a display device of a computing device, the computing device also having a rotational input device with an exposed upper surface and the computing device further having a button disposed within a periphery of the exposed upper surface, said method comprising:
   detecting a rotational movement associated with a user input action with respect to the exposed upper surface of the rotational input device, the rotational input device producing annular-based output signals corresponding to the rotational movement;
   converting the annular-based output signals from the rotational input device that correspond to the rotational movement into a linear movement; and applying the linear movement to at least one object of the graphical user interface being produced on the display device to provide visual feedback correlated to the rotational movement associated with the user input action on the display device;

detecting a user input action with respect to the button; and processing the user input action with respect to the button.

14. A method as recited in claim 13, wherein the at least one object is a list of items.

15. A method as recited in claim 14, wherein at least a portion of the items in the list are simultaneously displayed on the display device.

16. A method as recited in claim 15, wherein one of the items in the list being simultaneously displayed is rendered visually distinctive.

17. A method as recited in claim 14, wherein the items are media items.

18. A method as recited in claim 17, wherein the computing device is a pocket-sized media player, and the display device is a pixel-based display device.

19. A method as recited in claim 18, wherein the pixel-based display device is a liquid crystal display with a light-emitting diode backlight.

20. A method as recited in claim 18, wherein the computing device further includes a storage device that stores digital content of the media items.

21. A method as recited in claim 13, wherein the computing device is a pocket-sized media player, and the display device is a pixel-based display device.

22. A method as recited in claim 13, wherein the user input action is a rotational action, and wherein the rotational movement results from the rotational action.

23. A method as recited in claim 13, wherein the rotational input device comprises a rotatable wheel coupled to the computing device.

24. A method as recited in claim 23, wherein the rotational movement is provided by rotation of the rotatable wheel.

25. A method as recited in claim 13, wherein the rotational input device is a touch pad, and wherein the user input action is provided via the touch pad coupled to the computing device.

26. A method as recited in claim 25, wherein the rotational movement is provided by a rotational user input action with the touch pad.

27. A method as recited in claim 13, wherein the degree of rotation determines the amount of linear movement being applied.

28. A method as recited in claim 13, wherein only a single finger of the user need be used to detect the rotational movement associated with the user input action with respect to the exposed upper surface of the rotational input device, and the single finger can be used to complete one or more revolutions of the rotational input device without lifting the finger from the rotational input device.

29. A computer readable medium including at least computer program code for interacting with a graphical user interface produced on a display device of a computing device, the computing device also having a user input device, the user input device including a rotational input unit and a button, said computer readable medium including at least:

computer program code for receiving a rotational movement associated with a user input action by a user via the rotational input unit, the user input action being through interaction with the user input device, wherein only a single finger of the user need be used to provide the rotational movement via the user input action with the user input device, and the single finger can be used to complete one or more revolutions of the user input device without lifting the finger from the user input device;

computer program code for converting the rotational movement into a linear movement;

computer program code for applying the linear movement to at least one object of the graphical user interface being produced on the display device, wherein the linear movement being applied to the at least one object of the graphical user interface provides visual feedback correlated to the rotational movement associated with the user input action on the display device; and computer program code for detecting a user input action with respect to the button; and computer program code for processing the user input action with respect to the button.

30. A portable media player, comprising:

a storage device that stores media content for each of a plurality of media items;

a display screen that displays a portion of the media items at a time;

a user input device having an exposed upper surface that enables a user of said portable media player to at least identify a particular media item from the media items being displayed through a rotational action with respect to the exposed upper surface of said user input device, wherein said user input device comprises a touch pad capable of rotational sensing, wherein said user input device further comprises a button separate from said touch pad, and wherein said button is provided at the center of said touch pad; and a processor operatively connected to said storage device and said user input device, said processor controls said portable media player to play the media content of the particular media item that was identified using said user input device, wherein, responsive to the rotational action with respect to the exposed upper surface of said user input device, visual feedback is provided on said display screen.

31. A portable media player as recited in claim 30, wherein said portable media player is battery-operated.

32. A portable media player as recited in claim 31, wherein said portable media player is pocket-sized.

33. A portable media player as recited in claim 30, wherein said processor further controls said portable media player to receive annular inputs directly from said user input device.

34. A portable media player as recited in claim 30, wherein said storage device is a storage disk drive.

35. A portable media player as recited in claim 30, wherein said display screen is a liquid crystal display with a light-emitting diode backlight.

36. A portable media player as recited in claim 35, wherein the light-emitting diode is white.

37. A portable media player as recited in claim 30, wherein said display screen is a pixel-based display device.

38. A portable media player as recited in claim 30, wherein said portable media player comprises an audio player, and wherein the media content for the media items includes at least audio files of songs.

39. A portable media player as recited in claim 30, wherein said portable media player comprises a video player, and wherein the media content for the media items includes at least video files of videos.

40. A portable media player as recited in claim 30, wherein said portable media player comprises an image viewer, and wherein the media content for the media items includes at least image files of images.

41. A portable media player as recited in claim 30, wherein only a single finger of the user need be used to provide the rotational action with respect to the exposed upper surface of said input device.

42. A portable media player as recited in claim 41, wherein the single finger can be used to complete one or more revolutions of said user input device without lifting the finger from said user input device.

43. A portable media player as recited in claim 30, wherein the exposed upper surface of said user input device is a completely exposed upper surface, and wherein the rotational action is with respect to the completely exposed upper surface of said user input device.

44. A portable media player as recited in claim 1, wherein the exposed upper surface of said user input device is a completely exposed upper surface, and wherein the rotational action is with respect to the completely exposed upper surface of said user input device.

45. A computer readable medium as recited in claim 29, wherein the computing device is battery powered and pocket-sized.

* * * * *

UNITED STATES PATENT AND TRADEMARK OFFICE
CERTIFICATE OF CORRECTION

| | | |
|---|---|---|
| PATENT NO. | : 7,345,671 B2 | Page 1 of 1 |
| APPLICATION NO. | : 10/259159 | |
| DATED | : March 18, 2008 | |
| INVENTOR(S) | : Robbin et al. | |

It is certified that error appears in the above-identified patent and that said Letters Patent is hereby corrected as shown below:

Title page, page 3, under FOREIGN PATENT DOCUMENTS, change:

"JP 2002-215549 8/2000" to --JP 2000-215549 8/2000-- last line

Signed and Sealed this

Thirty-first Day of March, 2009

JOHN DOLL
*Acting Director of the United States Patent and Trademark Office*